Patented Nov. 8, 1932

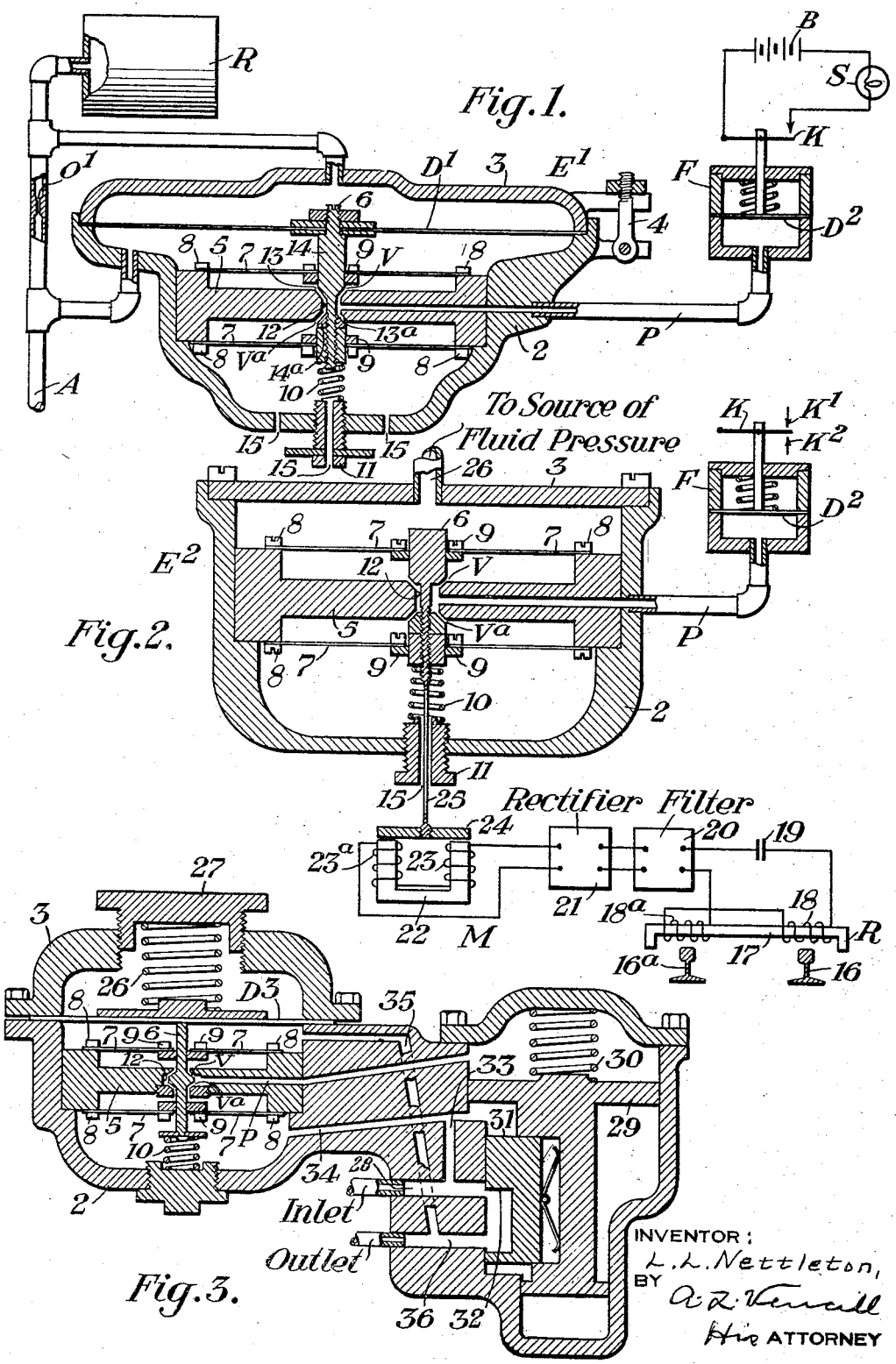

1,887,322

UNITED STATES PATENT OFFICE

LEWIS L. NETTLETON, OF EDGEWOOD, PENNSYLVANIA

VALVE FOR CONTROLLING FLUID PRESSURE

Application filed September 29, 1928. Serial No. 309,217.

My invention relates to valves for controlling fluid pressure.

I will describe several forms of valves embodying my invention, and will then point out the novel features thereof in claims.

The present case is in part a continuation of my co-pending application, Serial No. 273,883, filed April 30, 1928, for signaling apparatus.

In the accompanying drawing, Fig. 1 is a diagrammatic view illustrating one form of valve embodying my invention applied to a receiver for train brake pipe signals. Fig. 2 is a view showing one form of valve embodying my invention applied to a pneumatic amplifier. Fig. 3 is a view showing a feed valve embodying my invention.

Similar reference characters refer to similar parts in each of the three views.

Referring first to Fig. 1, the reference character A designates a train brake pipe which is normally supplied with fluid pressure, usually air under pressure, and which controls the brake applying apparatus in the usual and well known manner. A reservoir R is connected with the brake pipe A through a restricted orifice $O^1$. The brake pipe is provided with signal transmitting means which form no part of my present invention, but which are adapted to impress pressure pulsations on the air in the brake pipe. These impulses may be either increases of brake pipe pressure or decreases of brake pipe pressure, and they may for example, be caused by apparatus similar to the transmitting apparatus disclosed in my co-pending application for Letters Patent of the United States, Serial No. 238,567, filed December 8, 1927, for signaling apparatus and methods. The receiving apparatus includes a pneumatic amplifier comprising a body member 2 and a cover 3 which are clamped together by bolts 4, with a diaphragm $D^1$ interposed between the body member and the cover. Mounted within the body member 2 is a member 5 having a passage 12 between two opposing valve seats 13 and $13^a$. Valve stem 6 extends through the passage 12 and is provided with two valve elements 14 and $14^a$ co-operating with the valve seats 13 and $13^a$ to form valves V and $V^a$, respectively. Valve stem 6 is operatively connected with the diaphragm $D^1$ and is urged upwardly by a spring 10 which may be adjusted by a screw 11. The upper side of diaphragm $D^1$ is subjected to the pressure in reservoir R and the lower side of this diaphragm is subjected to the pressure in the brake pipe A.

A pneumatic relay F is connected, through an auxiliary pipe P with the passage 12 in member 5. The relay F comprises a diaphragm $D^2$, the lower side of which is subjected to the pressure existing in pipe P. The diaphragm $D^2$ operates a contact K which controls the supply of current to a signal S from a battery B.

In explaining the operation of the apparatus, I will first assume that the pressure in the brake pipe A has been constant for a length of time such that the pressures in all parts of the apparatus have reached an equilibrium. The pressures on the two sides of diaphragm $D^1$ are therefore equal, and the pressure of spring 10 is adjusted by screw 11 so that under these conditions valves V and $V^a$ are both open. A small stream of air therefore flows from the brake pipe A, through valve V, passage 12, and valve $V^a$ to atmosphere through the ports 15. The total drop in fluid pressure from the brake pipe through valves V and $V^a$ to atmosphere divides between these two valves so that the pressure in pipe P is intermediate between the brake pipe pressure and atmosphere. The parts of relay F are so adjusted that the pressure thus supplied to diaphragm $D^2$ is not sufficient to close contact K, and lamp S is therefore extinguished.

I will next assume that there is a small increase in the pressure in brake pipe A. This pressure change causes a higher pressure on the lower side of diaphragm $D^1$ than on the upper side of the diaphragm so that diaphragm $D^1$ bulges upwardly, thereby decreasing the opening of valve $V^a$ and increasing the opening of valve V. Both of these changes increase the pressure in pipe P so that the pressure on the underside of diaphragm $D^2$ increases and contact K closes to light lamp S.

In order to operate the relay F in response to very small changes in the pressure in the brake pipe, it is obvious that the valve stem 6 must be operated by extremely small amounts of energy. It is therefore desirable to eliminate the effects of friction in the support of this valve stem. I prefer to accomplish this result by supporting the valve stem 6 by a plurality of elastic metallic strips 7. One end of each strip 7 is attached to the valve stem 6 by a clamp 9 and the other end of the strip 7 is attached to the member 5 by a clamp 8. Preferably, one set of strips 7 is located on the upper side of member 5 and another set of strips 7 is located on the lower side of member 5, the upper and lower faces of this member being recessed to accommodate the strips 7 and the clamps 9. The strips 7 extend radially from the valve stem 6 and are drawn to the desired tension with the valve stem 7 centered with respect to the valve seats, and the strips are then attached to the member 5 by the clamps 8. With this construction, the valve stem 6 is free to move vertically without friction, and it encounters no frictional opposition until either valve V or $V^a$ is completely closed. I have found that the amplifier E shown in Fig. 1 may be constructed to operate a standard pneumatic relay F for the control of signal S in response to changes in the position of the valve stem 6 of the order of .001 of an inch.

Referring now to Fig. 2, the valve stem 6 contained in the body member 2 is similar to the corresponding part previously described in connection with Fig. 1 with the exception that the valve stem is operated by an electromagnet M instead of by the diaphragm $D^1$. The chamber above valve V is connected, by means of pipe 26, with a source of fluid pressure not shown in the drawing, and the pneumatic relay F is responsive to the pressure in passage 12 as in Fig. 1. The apparatus here shown may be actuated by small amounts of electrical current. In the form here shown electromagnet M is assumed to be a part of a train control system in which the train carried apparatus is responsive to currents flowing in the track rails. The reference characters 16 and $16^a$ designate the track rails of a stretch of railway track which are at times supplied with current which is periodically varied in accordance with traffic conditions. In one form of train control system of the type described, the track rails are supplied with alternating current which is periodically interrupted at different frequencies depending upon traffic conditions. The reference character R designates a receiver which in the form here shown comprises a magnetizable core 17 located in inductive relation with the track rails. The core 17 is provided with two windings 18 and $18^a$ in inductive relation with the track rails 16 and $16^a$, respectively, and connected in series in such manner that electromotive forces induced in these windings by train controlling currents in the track rails 16 and $16^a$ are additive. The receiver windings 18 and $18^a$ may be tuned to resonance at the frequency of the train controlling current by means of a condenser 19, and are connected through a filter 20 and a rectifier 21 with windings 23 and $23^a$ of the electromagnet M. The electromagnet M comprises a magnetizable core 22 which carries the windings 23 and $23^a$, and an armature 24 which is connected, by means of a rod 25, with the valve stem 6. The parts are so adjusted and proportioned that under normal conditions, for example, when uninterrupted alternating current is being supplied to rails 16 and $16^a$, the valve stem 6 under the influence of spring 10 occupies a position in which valves V and $V^a$ are opened by such amount that the pressure then existing in pipe P moves diaphragm $D^2$ to a position in which contact $K$—$K^1$ is open. If the current in the track rails is interrupted, the current supplied to the windings of the electromagnet M is interrupted, and spring 10 then moves valve stem 6 upwardly to open valve V and close valve $V^a$. Both of these effects increase the pressure in pipe P, whereupon the pneumatic relay F is operated to close contact $K$—$K^1$. When the current in the track rails is re-established, the electromagnet M is again energized to close valve V and open valve $V^a$. As a result, the pressure in pipe P is reduced and contact $K$—$K^1$ of pneumatic relay F is opened. The contact $K$—$K^1$ may be used to control other apparatus, not illustrated, in any suitable manner. Under some conditions it may be desired to add a second fixed contact $K^2$ and adjust the apparatus in such manner that the contact swings alternately into engagement with contacts $K^1$ and $K^2$ when the current in the track rails is periodically interrupted.

It should be observed that although in the discussion just preceding, I have spoken of "opening" and "closing" of valves V and $V^a$, it should be distinctively understood that any movement of the valve stem 6, no matter how slight, will result in some change in the relative openings of valves V and $V^a$ and this change is reflected in a comparatively large change in the pressure in pipe P. It should also be pointed out that due to the novel suspension of the valve stem 6, there is no frictional opposition to the movements of this valve stem until one of the associated valves has completely closed. It follows, therefore, that with apparatus embodying my invention, a minute change in the current supplied to the electromagnet M may be utilized to operate a standard pneumatic relay F.

Electropneumatic amplifiers of the type shown in Fig. 2 are rugged in construction, simple in operation, and may be constructed to have a very large amplification constant.

In the form of apparatus shown in Fig. 3, I have illustrated a feed valve of the type customarily employed in railway air brake systems and similar apparatus. The feed valve comprises a valve body provided with an inlet port 28 which is connected with a suitable source of fluid pressure not shown in the drawing. An outlet port 36 is connected with the apparatus which it is desired to supply with fluid pressure. The outlet port 36 will usually be connected through the engineman's brake valve with the train brake pipe. A slide valve 31 controlled by a piston 29 and provided with a port 32 regulates the opening between the inlet port 28 and the outlet port 36, the piston 29 being biased by spring 30 into a position in which port 28 is closed. The underside of piston 29 is connected with the inlet port 28 through port 33, and the upper side of piston 29 is connected through pipe P with a passage 12 in a member 5 similar to the corresponding part in Figs. 1 and 2. Passage 12 contains a valve stem 6 supported by radially extending elastic strips 7 in the same manner as was described in connection with Figs. 1 and 2. The valve stem 6 is urged downwardly by a spring 26 operating on a diaphragm $D^3$, the lower surface of which is subjected to the pressure in the outlet port 36, with which it is connected by means of port 35. The valve stem 6 is urged upwardly by the spring 10, the chamber beneath valve $V^a$ being connected, through ports 34 and 33, with the inlet port 28.

In operation air flows from the inlet port 28, through port 32, to the outlet port 36. A stream of air also flows from port 28, through ports 33 and 34, valve $V^a$, passage 12, valve V, and port 35 to port 36. If the pressure in the outlet port 36 decreases, the pressure on the underside of diaphragm $D^3$ decreases, and spring 26 moves valve stem 6 downwardly to close valve $V^a$ and open valve V. The pressure in pipe P, and hence the pressure above piston 29, is therefore decreased and the pressure on the underside of this piston moves the piston upwardly to increase the opening of port 32 between the inlet and outlet ports. The pressure in the outlet port is thereby increased. If, on the other hand, the pressure on the outlet port increases above the value determined by the force exerted by spring 26, the diaphragm $D^3$ is moved upwardly, thus allowing spring 10 to move valve stem 6 upwardly. As a result of this movement of the valve stem, valve V is closed and valve $V^a$ is opened. Both of these changes increase the pressure in pipe P, and hence above the piston 29. The piston is therefore moved downwardly to decrease the opening between the inlet port 28 and the outlet port 36. It will be seen from the foregoing explanation that for any given value of the pressure caused by spring 26, an increase in the pressure in the outlet port 36 above this pressure, will cause a movement of the slide valve 31 in one direction and a decrease in the pressure in the outlet port 36 below this value will cause a movement of the slide valve in the opposite direction. One advantage of the apparatus embodying my invention over feed valves hereto known is that a very small change in the outlet port pressure will cause a change in the position of the valve stem 6. Since the movement of this valve stem is not opposed by friction, it follows that extremely close regulation of the outlet port pressure may be accomplished, because the valves V and $V^a$ change their relative openings in response to small changes in the pressure on the underside of the diaphragm $D^3$.

Although I have herein shown and described only a few forms of valves embodying my invention, it is understood that various changes and modifications may be made therein within the scope of the appended claims without departing from the spirit and scope of my invention.

Having thus described my invention, what I claim is:

1. In combination, a fixed member, a valve stem, a plurality of stretched elastic strips each having one end attached to said stem and the other end fixed with respect to said member, a pipe, a source of fluid pressure, two valves controlled by said stem one of which connects said source with said pipe and the other of which connects said pipe with atmosphere, and means for operating said stem to vary the relative openings of said two valves.

2. In combination, a valve stem, a plurality of radially extending elastic strips each attached to said stem at the inner end of the strip and fixed at the outer end, a valve controlled by said stem, a winding supplied with varying current, and means for moving said stem in accordance with variations in said current.

3. In combination, a valve stem, a plurality of radially extending elastic strips each attached to said stem at the inner end of the strip and fixed at the outer end, a source of fluid pressure, a pipe, two valves controlled by said stem one of which connects said pipe with said source and the other of which connects said pipe with atmosphere, and an electromagnet for operating said stem.

In testimony whereof I affix my signature.

LEWIS L. NETTLETON.